3,019,211
USE OF PHENYLENE DI-TERTIARY AMINES IN RUBBER

Harry E. Albert, Lafayette Hill, Pa., assignor to The Firestone Tire & Rubber Company, Akron, Ohio, a corporation of Ohio
No Drawing. Filed Dec. 5, 1958, Ser. No. 778,293
6 Claims. (Cl. 260—45.9)

This invention relates to the use of phenylene ditertiary amines as rubber antiozonants. It includes the stabilized rubbers and the process of preparing them.

The phenylene di-tertiary amines used in carrying out the invention are tetra-substituted para-phenylenediamines. They do not include the lower boiling compounds but only those that are less volatile and therefore are effective in the rubber products for prolonged periods of time. They are compounds of the formula

RR'N.C$_6$H$_4$.NRR' in which each R is an alkyl group containing 1 to 8 carbon atoms and each R' is a secondary or tertiary alkyl or cycloalkyl radical containing 4 to 8 carbon atoms. The antiozonants include, for example:

N,N'-di-n-butyl-N,N'-di-t-butyl-p-phenylenediamine
N,N'-dimethyl-N,N'-di-t-amyl-p-phenylenediamine
N,N,N',N'-tetra-sec-butyl-p-phenylenediamine
N,N,N',N'-tetra-tt-octyl-p-phenylenediamine
N,N'-diethyl-N,N'-di-cyclohexyl-p-phenylenediamine
N,N' - di - n - propyl - N,N' - di - cyclopentyl - p - phenylenediamine
N,N' - di - isopropyl - N,N' - di - (1 - methylcyclopentyl)-p-phenylenediamine
N,N' - dimethyl - N,N' - di - (1 - methylcyclohexyl) - p-phenylenediamine The foregoing are illustrative, and all compounds within the scope of the claims are included herein.

The antiozonants are effective in SBR whether vulcanized with sulfur, etc. or otherwise crosslinked.

The following examples illustrate the preparation of the di-tertiary amines. In each case N,N'-di-sec-butyl-p-phenylenediamine was first prepared.

PREPARATION OF N,N'-DI-sec-BUTYL-p-PHENYLENEDIAMINES

Fifty-four grams (0.5 mole) of p-phenylenediamine were dissolved in 288 g. (4 moles) of methyl ethyl ketone. Two grams of a catalyst consisting of an intimate mixture of copper oxide, chromium oxide and barium oxide were added to the solution. The resulting mixture was placed in a suitable autoclave and submitted to hydrogenation, under a pressure of 35–55 atmospheres of hydrogen at 155° C. After absorption of the hydrogen had ceased, the reaction mixture was cooled, removed from the autoclave, the catalyst filtered off, and the resulting solution evaporated under a vacuum of approximately 20 mm. of mercury, at 140° C. in order to remove water, secondary butyl alcohol and excess methyl ethyl ketone. The residue of crude phenylenediamine weighed 110 grams. This yield is equal to the theoretical quantity of N,N'-di-sec-butyl-p-phenylenediamine.

Example I

The N,N'-di-sec-butyl-p-phenylenediamine used as the starting material was a freshly distilled, straw-colored liquid with B.P.=170° C./10 mm. This was converted to the di-hydrochloride in a 3-neck flask equipped with a stirrer, inlet tube and dropping funnel. Ether was put in the flask and the N,N'-di-sec-butyl-p-phenylenediamine was dropped into it while dry hydrogen chloride was passed into the ether solution. The dihydrochloride produced was a light red solid which, when filtered and dried, had M.P.=254° C. (dec.)

Then .10 mole (29.2 g.) of this N,N'-di-sec-butyl-p-phenylenediamine di-hydrochloride and .40 mole (12.8 g.)—100 percent excess—methanol were placed in a 25-mm. Carius tube and heated in a furnace at 154° C. for 8 hours. The resulting dark liquid was neutralized with NaHCO$_3$ and extracted with chloroform to obtain N,N'-dimethyl-N,N'-di-sec-butyl-p-phenylenediamine. It was dried over MgSO$_4$ and distilled under vacuum. It has B.P. 165°–175° C. at 10 mm. The yield was 26 g. The dihydrochloride of the product melted at 197° C. (dec.) and the picrate at 145° C. X-ray diffraction diagrams showed this picrate was different from that of N,N'-di-sec-butyl-p-phenylenediamine.

Example II

A reaction mixture was prepared from:

88.0 g. (0.4 mole) N,N'-di-sec-butyl-p-phenylenediamine di-hydrochloride
42.4 g. (0.4 mole) Na$_2$CO$_3$ in 250 ml. water
110.0 g. (0.8 mole) n-butyl bromide added to the reaction mixture while it was heated to 100° C. for over 1 hour.

The reaction mixture was refluxed for 5 hours. It was taken up in an ether-hexane mixture and washed with dilute aqueous ammonia and then twice with water. The solution was dried over anhydrous sodium sulfate. The solvent was evaporated and the residue was distilled at 1.5 mm. The fraction of 35.0 g. distilling at 153–155° C. was N,N'-di-sec-butyl-N,N'-di-n-butyl-p-phenylenediamine.

The products of the two examples were tested in different rubber stocks, Example I having been tested in a stock intended for use in the sidewall of a tire, and Example II in a tire tread stock. The rubber in each stock was SBR (formerly called GR–S). The formula for the sidewall stock was:

| | Parts by weight |
|---|---|
| SBR | 100 |
| Black | 45 |
| Zinc oxide | 3 |
| Softener | 10 |
| Sulfur | 2 |
| Accelerator | 1.3 |
| Masterbatch | 161.3 |

This stock (both with and without 2 parts of antiozonant) was cured 60 minutes at 280° F. The formula for the tread stock was:

| | Parts by weight |
|---|---|
| SBR | 100 |
| Sulfur | 1.7 |
| Black | 45 |
| Stearic acid | 2.5 |
| Zinc oxide | 2.4 |
| Accelerator | 1.2 |
| Softener | 6.6 |
| Masterbatch | 159.4 |

This stock (with and without 2 parts of antiozonant) was cured 80 minutes at 280° F.

Both stocks (both with and without antiozonant) were tested both before and after aging in an oxygen oven for 2 days at 212° F., and also were subjected to ozone aging as described by Ford and Cooper in A Study of the Factors Affecting the Weathering of Rubber-Like Materials— I and II in India Rubber World, volume 124, page 696 (September 1951), and volume 125, page 55 (October 1951). The sidewall stock was treated 7 hours at 95° F. in an atmosphere containing 60 parts of ozone per hundred million, and the tread stock was similarly treated but for 4 hours. The results of the ozone testing are rated both as to size and frequency of the cracks on a scale of 0=none to 5=maximum. The results which compare stock containing 2 parts of antiozonant per 100 parts of rubber with the masterbatches containing no antiozonant are given in the following tables:

TABLE 1.—TEST OF ANTIOZONANT OF EXAMPLE I

|  | Blank | Stock A |
|---|---|---|
| Masterbatch | 161.3 | 161.3 |
| N,N'-dimethyl-N,N'-di-sec-butyl-p-phenylenediamine |  | 2 |
| Total | 161.3 | 163.3 |
| Normal Properties: |  |  |
| 300% Modulus | 1,450 | 1,475 |
| Tensile | 1,975 | 2,225 |
| Elongation | 380 | 430 |
| Aged 2 Days at 212° F.: |  |  |
| 300% Modulus |  |  |
| Tensile | 1,875 | 2,000 |
| Elongation | 225 | 250 |
| Ozone Cracking: |  |  |
| Static— |  |  |
| Size | 3 | 2 |
| Frequency | 5 | 1 |
| Dynamic— |  |  |
| Size | 2+ | 0 |
| Frequency | 5 | 0 |

TABLE 2.—TEST OF ANTIOZONANT OF EXAMPLE II

|  | Blank | Stock B |
|---|---|---|
| Masterbatch | 159.4 | 159.4 |
| N,N'-di-n-butyl-N,N'-di-sec-butyl-p-phenylenediamine |  | 2 |
| Total | 159.4 | 161.4 |
| Normal Properties: |  |  |
| 300% Modulus | 725 | 625 |
| Tensile | 3,550 | 3,375 |
| Elongation | 655 | 675 |
| Aged 2 Days at 212° F.: |  |  |
| 300% Modulus | 1,975 | 1,625 |
| Tensile | 2,300 | 2,425 |
| Elongation | 325 | 385 |
| Ozone Cracking: |  |  |
| Static— |  |  |
| Size | 4 | 2+ |
| Frequency | 5 | 1 |
| Dynamic— |  |  |
| Size | 2+ | 0+ |
| Frequency | 5 | 5 |

The record of the modulus and tensile strength is given in pounds per square inch, and the elongation in percentage.

The results show the effectiveness of these phenylene di-tertiary amines in protecting against ozone deterioration. The tests refer only to SBR, and the compounds are effective in all butadiene-styrene copolymer rubbers containing 50 percent or more by weight of bound 1,3-butadiene, both in white and light-colored stocks as well as in stocks containing carbon black.

Crosslinked rubber is a rubber made less soluble, less thermoplastic and more elastic by crosslinking. Crosslinking includes vulcanization or curing of a rubber, and can be accomplished by any known crosslinking agent or method. A rubber can be crosslinked by heating it with sulfur or a sulfur-bearing curing agent, preferably in the presence of a suitable accelerator, and this process is well known in the rubber art as sulfur vulcanization. Other curing agents such as selenium or tellurium can be used in conjunction with or replacing sulfur.

A different class of curing agents for rubbers includes the well known di- or poly-nitroso compounds, quinone oximes and anils, di- and poly-nitro compounds, bis- and poly-azo compounds, diazoamino compounds, and various organic peroxides, including dicumyl peroxide, for example. The rubber is usually heated with the curing agent to effect the desired crosslinking, as is known in the art. This type of curing agent can be accelerated by lead oxides, for example read lead ($Pb_3O_4$), quinone dianils, substituted phenylenediamines, etc., as is known in the art.

Rubbers are cured also by heating admixed with a curable resin, such as a phenol-aldehyde resol or even the monomeric dimethylol- or polymethylol-phenol. The phenol is advantageously nuclearly substituted by a hydrocarbon radical. An example of this type of curing agent is the resol formed by condensing a molar excess of formaldehyde with p-tt-octylphenol in the presence of an alkaline catalyst.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyldithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene-dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization of a suitably activated rubber composition does take place at lower temperatures such as at room temperature. For example, a latex film containing a sulfur curing agent and an activated ultra accelerator can be cured by allowing the film to remain at room temperature for several hours or a few days.

Any suitable amount of the substituted phenylenediamine will be used, depending upon the use to which the rubber is to be put. Usually from 0.1 to 10 parts per hundred parts of the rubbery copolymer will be employed.

The invention is covered in the claims which follow. What I claim is:

1. Crosslinked butadiene-styrene rubber containing an antiozonant amount of N,N'-dialkyl-N,N'-di-sec-butyl-p-phenylenediamine of the class consisting of N,N'-dimethyl-N,N'-di-sec-butyl-p-phenylenediamine and N,N'-di-n-butyl-N,N'-di-sec-butyl-p-phenylenediamine, said rubber containing at least 50 percent of butadiene.

2. Crosslinked butadiene-styrene rubber containing an antiozonant amount of N,N'-dimethyl-N,N'-di-sec-butyl-p-phenylenediamine, said rubber containing at least 50 percent of butadiene.

3. Crosslinked butadiene-styrene rubber containing an antiozonant amount of N,N'-di-n-butyl-N,N'-di-sec-butyl-p-phenylenediamine, said rubber containing at least 50 percent of butadiene.

4. The method of treating butadiene-styrene rubber which comprises crosslinking the same in the presence of an antiozonant amount of N,N'-dialkyl-N,N'-di-sec-butyl-p-phenylenediamine of the class consisting of N,N'-dimethyl - N,N' - di - sec - butyl-p-phenylenediamine and N,N' - di - n - butyl - N,N'- - di - sec - butyl - p - phenylenediamine, said rubber containing at least 50 percent of butadiene.

5. The method of treating butadiene-styrene rubber which comprises crosslinking the same in the presence of an antiozonant amount of N,N'-dimethyl-N,N'-di-sec-butyl-p-phenylenediamine, said rubber containing at least 50 percent of butadiene.

6. The method of treating butadiene-styrene rubber which comprises crosslinking the same in the presence of an antiozonant amount of N,N'-di-n-butyl-N,N'-di-sec-butyl-p-phenylenediamine, said rubber containing at least 50 percent of butadiene.

References Cited in the file of this patent

UNITED STATES PATENTS

| | | |
|---|---|---|
| 2,129,135 | Jones | Sept. 6, 1938 |
| 2,883,362 | Rosenwald et al. | Apr. 21, 1959 |

Disclaimer 3,019,211.—*Harry E. Albert*, Lafayette Hill, Pa. USE OF PHENYLENE DI-TERTIARY AMINES IN RUBBER. Patent dated Jan. 30, 1962. Disclaimer filed May 11, 1966, by the assignee, *The Firestone Tire & Rubber Company*.

Hereby enters this disclaimer to claims 1, 2, 4 and 5 of said patent.

[*Official Gazette September 20, 1966.*]